F. O. JAQUES, Jr.
DENTAL PRESS.
APPLICATION FILED MAR. 19, 1920.
1,371,245.
Patented Mar. 15, 1921.
2 SHEETS—SHEET 1.
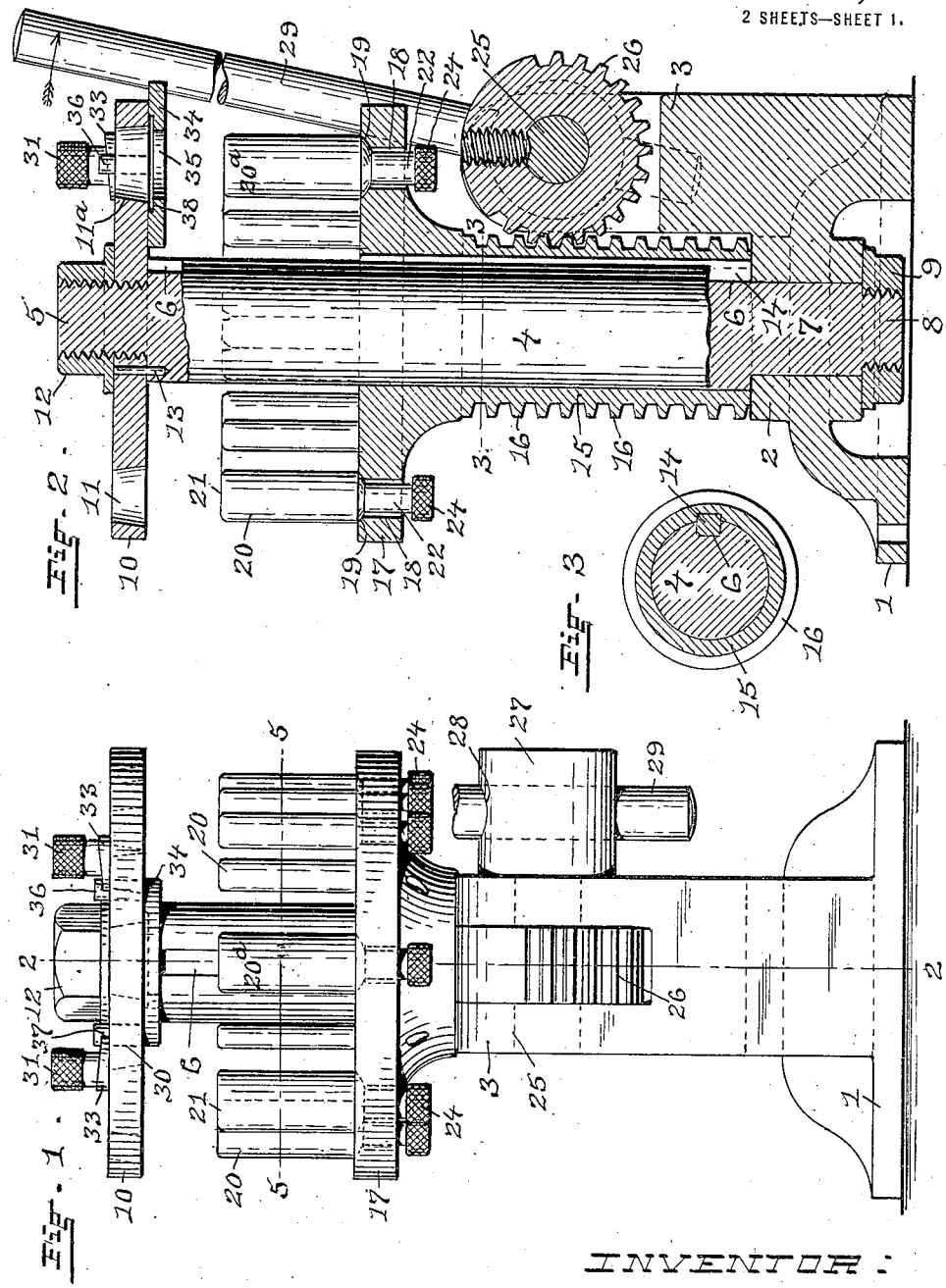

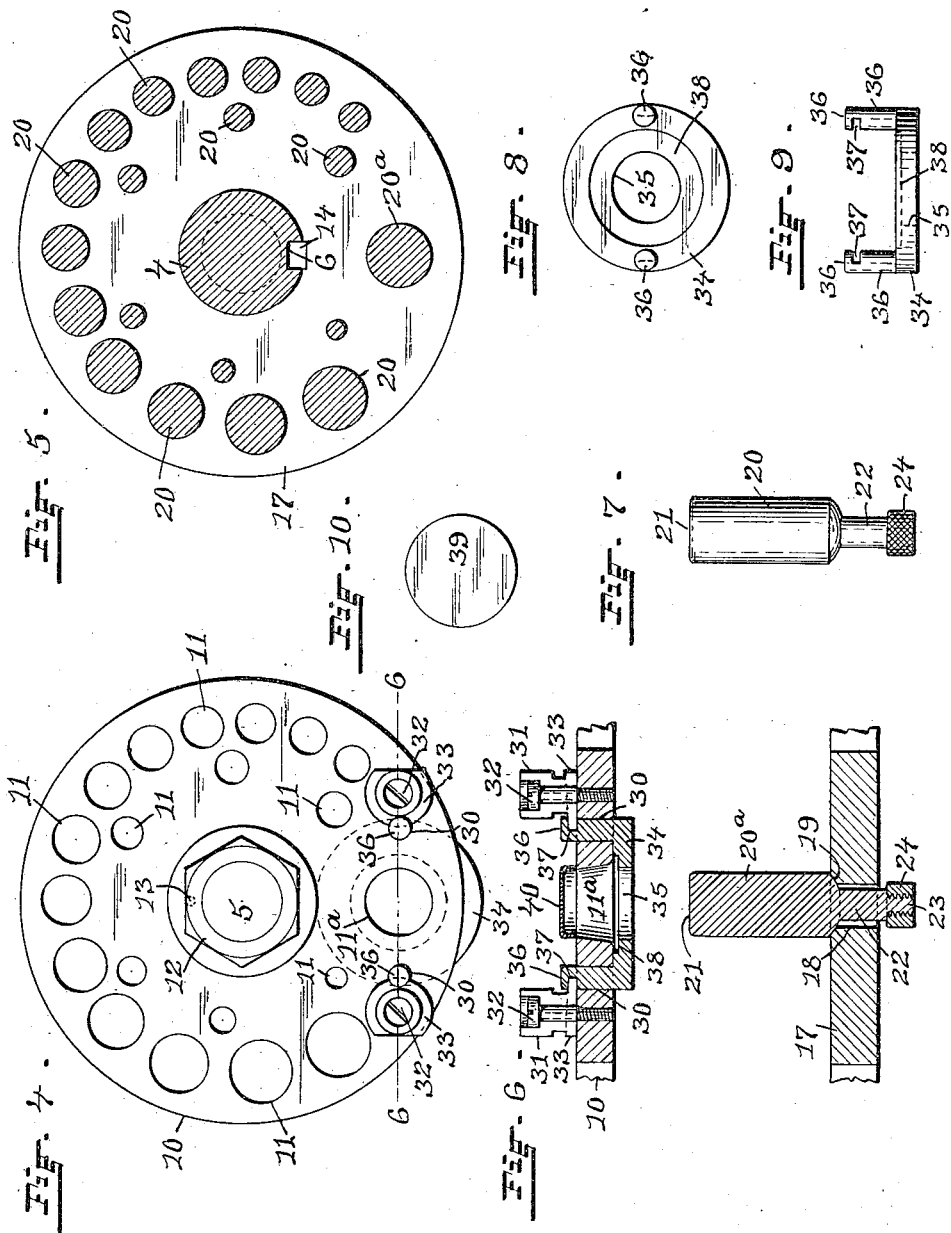

UNITED STATES PATENT OFFICE.

FERNANDO OSCAR JAQUES, JR., OF PROVIDENCE, RHODE ISLAND, ASSIGNOR OF ONE-THIRD TO LOUIS SHELDON MOULTHROP, OF PROVIDENCE, RHODE ISLAND.

DENTAL PRESS.

1,371,245.   Specification of Letters Patent.   Patented Mar. 15, 1921.

Application filed March 19, 1920. Serial No. 367,291.

*To all whom it may concern:*

Be it known that I, FERNANDO OSCAR JAQUES, Jr., a citizen of the United States, residing at Providence, in the county of Providence and State of Rhode Island, have invented a new and useful Improvement in Dental Presses, of which the following is a specification.

My invention has reference to an improvement in dental instruments, and more particularly to an improvement in dental presses for forming dental crown shells from sheet metal blanks.

In dental presses having a plurality of plungers, as heretofore constructed, the plungers are rigidly secured in place. This necessarily requires extreme accurate setting and fastening of each plunger in place so that the plungers will each have an accurate drawing movement through each drawing hole in the die plate. When the plungers are inaccurately set, the shells thus produced are thin on one side and thick on the other side, thereby ruining the utility of the shells.

The object of my invention is to provide a dental press with self centering plungers, thereby producing a perfect shell at each operation of a plunger.

A further object of my invention is to improve the construction of a dental press whereby the operation of the press is improved, a more perfect crown shell obtained, the shells automatically and positively removed from the plungers, the construction and operation simplified and the cost of manufacturing the press reduced.

My invention consists in the peculiar and novel construction and operation of a dental press, said dental press having details of construction, as will be more fully set forth hereinafter and claimed.

Figure 1 is a vertical front view of my improved dental press showing the plungers in their normal down position.

Fig. 2 is a central vertical sectional view taken on line 2.2 of Fig. 1.

Fig. 3 is a transverse sectional view through the circular rack and spindle, as indicated by line 3.3 of Fig. 2.

Fig. 4 is a plan view looking at the top of the press.

Fig. 5 is a transverse sectional view through the plungers taken on line 5.5 of Fig. 1.

Fig. 6 is a detail vertical sectional view taken on line 6.6 of Fig. 4.

Fig. 7 is a side view of one of the plungers removed from the press.

Fig. 8 is a top plan view of the blank holding member.

Fig. 9 is an edge view of the blank holding member, and

Fig. 10 is a face view of a flat metal blank in the form of a disk.

My improved dental press consists, as shown in the drawings, of a base 1 having a central vertical bearing 2 and a bifurcated horizontal front bearing 3 which extends upward on the front of the press. A round spindle 4 has a shouldered screw-threaded upper end 5, a longitudinal slot 6 a shouldered and reduced lower portion 7, rotatably supported in the vertical bearing 2 and a shouldered screw-threaded lower end 8 on which is a nut 9 for holding the spindle in place. A round horizontal die plate 10, having two circular rows of round graduated drawing holes 11, 11 is secured centrally to the upper end 5 of the spindle 4 by a nut 12 and a pin 13, as shown in Fig. 2. Reciprocally secured to the spindle 4 by a spline 14 in the slot 6 is a sleeve 15 having a series of circular rack teeth 16, 16. The sleeve 15 merges upward into a round horizontal plunger holding plate 17 having two circular rows of plunger holes 18, 18, corresponding in number and position to the drawing holes in the die plate. Each plunger hole 18 has a dished upper end 19, as shown in Figs. 2 and 6. In the plunger holes 18, 18 are loosely secured graduated cylindrical vertical plungers 20, 20 each plunger 20 having a rounded edge upper end 21, a reduced stem 22 which fits loosely in a plunger hole 18, and a screw-threaded lower end 23 on which is a nut 24 which limits the upward movement of the plunger in the hole in the plunger holding plate. A shaft 25 is rotatably supported in the horizontal bearing 3, it carries a pinion 26 in mesh with the circular rack teeth 16, 16, and has an outside head 27 with a transverse hole 28 in which is a hand operating lever 29. The spindle 4, die plate 10 and plunger holding plate 17 rotate as one and the sleeve 15, rack teeth 16, 16 and plunger holding plate 17 has vertical reciprocating movements on the spindle 4. A vertical hole 30 is formed in the die plate 10 at each side of and on a center line with the largest drawing hole 11ª, as shown in Figs. 4 and 6. On the same center line and at the outside of each hole 30 is rotatably secured a locking member 31 by a screw 32 which screws into the die plate 10, each locking member 31 having a cam lip 33. A circular blank holding member 34 is shaped to have a central plunger hole 35, two oppositely disposed studs 36, 36, each stud having a nick 37, adjacent its end, and a shallow circular depression 38 for a sheet metal blank 39, as shown in Fig. 10. A plurality of blank holding members are used, each having a different size depression 38 for a different size blank. The blank holding member 34 with a blank is detachably secured in place to the underside of the die plate 10 by passing the studs 36, 36 upward through the holes 30, 30 and turning the cam lips 33, 33 into the nicks 37, 37 in the studs.

The plungers vary uniformly in diameter from the smallest to the largest which is used for the initial drawing up of the blank in the blank holding member. All of the drawing holes 11, 11 and 11ª are tapered, as shown in Fig. 2, and a plurality of the blank holding members are furnished with each press.

In the operation of the press, a sheet metal blank 39, usually of gold of the required size, is placed in the depression 38, in the blank holding member 34, and the blank holding member secured in place as described and shown in Figs. 4 and 6. The hand lever 29 is then operated in a downward direction and through the shaft 25, the pinion 26, the circular rack teeth 16, 16 and the plunger plate 17, the plungers 20, 20 are forced upward through the drawing holes 11, 11 and 11ª. In the upward movement of the plungers the largest plunger 20ª passes through the plunger hole 35 in the blank holding member and engaging with the blank 39 forces the blank upward through the drawing hole 11ª in the die plate, thereby cupping the blank. On the downward movement of the loose plunger, the cupped blank 40 will catch on the edge of the drawing hole and will be stripped from the plunger, as shown in Fig. 6. These operations are repeated on the different size plungers until the required size of crown shell is obtained.

A plurality of cupped blanks may be drawn out into crown shells simultaneously, the plungers may be brought around into the most convenient position for use, and through the plungers being self-centering, a more perfect crown shell is produced than has heretofore been done.

Having thus described my invention I claim as new:

1. A dental press comprising a base, a spindle rotatably secured at its lower end in the base, a die plate secured to the upper end of the spindle and having a circular row of drawing holes of varying diameters, a sleeve on and reciprocally secured to the spindle, circular rack teeth on the sleeve, a pinion rotatably supported on the base and meshing with the circular rack teeth, a plunger holding plate on the sleeve, a circular row of plungers corresponding in size and position to the circular row of drawing holes in the die plate, means for loosely securing the lower ends of the plungers to the plunger holding plate and means for rotating the pinion to reciprocate the plungers.

2. A dental press comprising a base, a spindle rotatably supported at its lower end in the base, a die plate secured to the upper end of the spindle and having a drawing hole, a blank holding member on the underside of the die plate and having a plunger hole coinciding with the drawing hole in the die plate, a blank holding depression and two oppositely disposed studs which extend through holes in the die plate, each stud having a nick at its upper end, two locking members rotatably secured to the die plate, each locking member having a cam lip which enters the nick in the corresponding stud and detachably locks the blank holding member to the die plate, a plunger holding plate reciprocally secured to the spindle, a plunger corresponding in size and position to the drawing hole in the die plate, means for loosely securing the plunger to the plunger holding plate and means for reciprocating the plunger holding plate on the spindle.

In testimony whereof, I have signed my name to this specification.

FERNANDO OSCAR JAQUES, Jr.